United States Patent [19]

Kakumu et al.

[11] Patent Number: 5,309,963
[45] Date of Patent: * May 10, 1994

[54] PNEUMATIC TIRE

[75] Inventors: Kiichiro Kakumu, Kobe; Masaki Shiraishi, Hiroshima; Hiroyuki Nakagawa, Tsuyama; Hiroaki Sakuno, Fukushima; Yoshiichiro Iwahashi; Shigeaki Suzuki, both of Wako, all of Japan

[73] Assignees: Sumitomo Rubber Industries, Ltd., Hyogo; Honda Giken Kogyo Kabushiki Kaisha, Tokyo, both of Japan

[ * ] Notice: The portion of the term of this patent subsequent to Jan. 12, 2010 has been disclaimed.

[21] Appl. No.: 594,166

[22] Filed: Oct. 9, 1990

[30] Foreign Application Priority Data

Oct. 12, 1989 [JP] Japan .................. 1-265495

[51] Int. Cl.$^5$ .............................................. B60C 11/11
[52] U.S. Cl. ............................................................ 152/209 R
[58] Field of Search ........... 152/209 R, 209 D, 209 A; D12/145-148

[56] References Cited

U.S. PATENT DOCUMENTS

| | | | |
|---|---|---|---|
| D. 279,088 | 6/1985 | Giron | D12/147 |
| D. 316,692 | 5/1991 | Fukumoto | D12/146 |
| 1,413,190 | 4/1922 | Rapson . | |
| 2,130,594 | 9/1938 | Mooradian | 152/209 R |
| 2,207,099 | 7/1940 | Maynard | 152/209 R |
| 3,023,798 | 3/1962 | Moore et al. | 152/209 R |
| 4,078,596 | 3/1978 | Nakajama et al. | 152/209 R |
| 4,178,199 | 12/1979 | Lippman et al. | 152/209 R |
| 4,412,576 | 11/1983 | Nakajima | 152/209 R |
| 4,953,604 | 9/1990 | Shepler et al. | 152/209 A |
| 5,178,699 | 1/1993 | Kakumu et al. | 152/209 R |

FOREIGN PATENT DOCUMENTS

| | | | |
|---|---|---|---|
| 0114594 | 8/1984 | . | |
| 0268436 | 5/1988 | European Pat. Off. . | |
| 0299729 | 1/1989 | European Pat. Off. | 152/209 R |
| 2363186 | 6/1975 | Fed. Rep. of Germany | 152/209 R |
| 0026608 | 2/1983 | Japan | 152/209 R |
| 0317808 | 12/1989 | Japan | 152/209 R |
| 142045 | 4/1920 | United Kingdom . | |
| 0520231 | 4/1940 | United Kingdom | 152/209 D |
| 1418171 | 12/1975 | United Kingdom | 152/209 R |
| 2051694 | 1/1981 | United Kingdom | 152/DIG. 3 |

OTHER PUBLICATIONS

"Automotive Tire Noise; A Comprehensive Study" Sound and Vibration, May 1974, pp. 42-47.

Primary Examiner—Michael W. Ball
Assistant Examiner—Nancy T. Krawczyk

[57] ABSTRACT

A pneumatic tire has a tread pattern with blocks which are divided by two circumferential grooves extending in the circumferential direction of a tire and eighty-five or more lateral grooves crossing the circumferential grooves in a tread part. In the tread pattern, the quotient $S_T/S$ of the total groove area $S_T$ which is the sum of the circumferential groove area $S_G$ and the lateral groove area Sg in a ground contact surface S when the tire is mounted on a standard rim, inflated with a normal internal pressure and loaded with a normal load, to the ground contact area S is in a range from 0.15 to 0.25, and the rate $Sg/S_G$ of the lateral groove area Sg to the circumferential groove area $S_G$ is in a range from 0.33 to 0.53.

4 Claims, 6 Drawing Sheets

PNEUMATIC TIRE

FIELD OF THE INVENTION

The present invention relates to a pneumatic tire provided with a tread pattern that can improve such various characteristics of a tire as the riding comfort, steering stability, wet resistance and low noise characteristics.

BACKGROUND OF THE INVENTION

An improvement of the tire's characteristics such as low noise and wet resistance characteristics as well as the riding comfort and steering stability are demanded. And it is known that a tread pattern is one of the factors that affect such characteristics.

There are such tread patterns as the lug pattern mainly composed of lateral grooves, the rib pattern mainly composed of circumferential grooves, the rib and lug pattern which intermediates the former two and the block pattern having blocks divided by circumferential and lateral grooves. And it is known that although, specifically, a tire having the block pattern is generally superior in characteristics against the road surface such as driving performance and hydroplaning characteristic, it is generally inferior in the steering stability concerned with the cornering power and wear resistance due to the relatively low rigidity of the blocks. However, in radial tires which are widely used in these days, the rigidity of the tread part is increased by a belt layer having superior hoop effect, and the wear resistance and steering stability are improved by employing harder tread rubbers. As the result, tires with the block pattern are being used in high-speed buses and passenger cars.

Therefore, as the application range of a tire is widened, it is more greatly required that the characteristics of a tire having such tread pattern are improved.

On the other hand, the circumferential and lateral grooves are factors that affect the tire's characteristics, and it is known that, when the total groove area of the circumferential and lateral grooves in the ground contact surface is smaller, the wet grip performance is reduced, while the low noise characteristic that relates to pattern noises is improved.

FIG. 2, for example, shows a result of measuring the pattern noise by changing the total groove area $S_T$, which is the sum of the circumferential and lateral groove areas $S_G$ and $S_g$, and aligning the grooves in the same manner. The total groove area quotient $S_T/S$ in the figure is the quotient of the total groove area $S_T$ in the ground contact surface to the ground contact area $S$ which is the area of the ground contact surface, and a pattern noise (dB) is shown on the axis of ordinates.

As shown in FIG. 2, as the total groove area quotient $S_T/S$ increases, and thereby the groove area is increased, it is recognized that the pattern noise is increased. However, the groove area is an inverse factor, as described hereinbefore, in regard to the wet resistance and pattern noise characteristics. Therefore, it is required to improve both characteristics of a tire in good balance.

The invention has been achieved as a result of various studies on the areas of circumferential and lateral grooves as well as their numbers. It is a primary object of the invention to present a pneumatic tire that can improve various characteristics in good balance in such manner that the wet resistance characteristic is improved, while reducing the pattern noise, and the riding comfort is also improved.

According to one aspect of the present invention, a pneumatic tire has a tread pattern divided by two circumferential grooves extending in the circumferential direction of a tire and eighty-five or more lateral grooves crossing the circumferential grooves in a tread part, wherein the quotient $S_T/S$ of the total groove area $S_T$ which is the sum of the circumferential groove area $S_G$ and the lateral groove area $S_g$ in a ground contact surface when the tire is mounted on a standard rim, inflated with a normal internal pressure and loaded with a normal load to the ground contact area $S$ is in a range from 0.33 to 0.53, and the quotient $S_g/S_G$ of the lateral groove area $S_g$ to the circumferential groove area $S_G$ is in a range from 0.33 to 0.25.

In order to lower the pattern noise and maintain the low noise level, as shown in FIG. 2, in the first place, the total groove area quotient $S_t/S$ is defined in a range of 0.15 to 0.25. If the area quotient $S_t/S$ exceeds 0.25, the pattern noise is increased, and also as the groove area increases, the block area is decreased, which may give rise to the shortage of dry grip strength and cornering power, sacrifice of steering stability and drop of wear resistance. Meanwhile, if the quotient $S_t/S$ is less than 0.15, the wet resistance is significantly lowered, and the riding comfort and other tire performance on the premise of the existence of grooves cannot be exhibited.

By setting the area quotient $S_t/S$ in a range of 0.25 or less, as mentioned above, the wet resistance performance is generally lowered. Therefore, various studies were prosecuted in order to enhance the wet resistance as far as possible even if the quotient $S_t/S$ is 0.25 or less. As the result, the present inventors took notice of the difference of the degree of effect of the circumferential grooves and lateral grooves on the wet resistance characteristic, and continued discussions and studies, mainly using tires in the size of 195/60R15, concerning the optimum selection about the distribution rate of the circumferential groove area $S_G$ and lateral groove area $S_g$, that is, the area quotient of lateral grooves and circumferential grooves $S_g/S_G$, as the quotient of the lateral groove area $S_g$ to the circumferential groove area $S_G$.

Accordingly, in order to see the relationship between the hydroplaning onset velocity which are important factors among the wet resistance characteristics, circumferential groove area quotient $(S_G/S)$, the quotient of the circumferential groove area $S_G$ in a ground contact area $S$ divided by the ground contact area $S$, and lateral groove area quotient $(S_g/S)$, the quotient of the lateral groove area $S_g$ in a ground contact area $S$ divided by the ground contact area $S$, the hydroplaning onset velocity was measured by using tires with tread patterns P1 to P5 with 1 to 4 circumferential grooves as shown in FIG. 5 to FIG. 9. The results are shown in Table 1.

On the basis of the results disclosed in Table 1, and also adding other measurement date, the following formula was obtained through a multiple regression analysis with the circumferential groove area quotient $S_G/S$ and lateral groove area quotient $S_g/S$ as independent variables, and the hydroplaning onset velocity (V: km/h) as a dependent variable:

$$V = 74.5 \times S_G/S + 31.0 \times S_g/S + 61.7$$

where S is the ground contact area as mentioned hereinbefore.

From the formula, it is recognized that the contribution of the lateral groove area quotient Sg/S to the hydroplaning onset velocity V is 31.0/74.5 times, or approximately 0.42 times, the circumferential groove area quotient $S_G/S$. Therefore, when the total groove area quotient $S_t/S$ is regulated, it is evident that the increase of the circumferential groove area quotient $S_G/S$ is effective only in regard to the hydroplaning onset velocity V, and further improvement can be achieved by eliminating the lateral grooves g to only leave the circumferential grooves G. In regard to only the other characteristics, specifically the riding comfort which is related to the envelope power, however, it is known that the lateral grooves g are indispensable. But it is shown by the formula that if the circumferential grooves G are eliminated and only the lateral grooves g are formed in order to improve the riding comfort, the wet resistance characteristic is deteriorated.

Therefore, an optimum balancing between the circumferential groove area quotient $S_G/S$ and the lateral groove area quotient Sg/S in the total groove area quotient $S_t/S$ is essential for the tire performance.

The inventors found that it is preferred to select the area quotient $Sg/S_G$ of the lateral grooves to the circumferential grooves according to the contribution ratio of the circumferential groove area quotient $S_G/S$ and the lateral groove area quotient Sg/S to the hydroplaning onset velocity, that is between 0.33 and 0.53 centered by the quotient 0.42.

That is, supposing that both circumferential and lateral grooves are indispensable, it is not an appropriate method to increase the lateral groove area Sg which is less contributory to the wet resistance characteristic that is an important characteristic of a tire, and therefore the tire's characteristics can be improved in good balance while preventing the deterioration in the wet resistance characteristics by forming the circumferential and lateral grooves in such manner that the contribution of the lateral grooves area quotient Sg/S is approximately 0.42 times (0.3 to 0.53 times) the circumferential groove area quotient $S_G/S$.

In order to improve the tire's characteristics even in such conditions that the total groove area quotient $S_t/S$ is in a range from 0.15 to 0.25, and the area quotient $Sg/S_G$ of the lateral grooves to the circumferential grooves is in a range from 0.33 to 0.5, in practically selecting a tread pattern, it comes to be indispensable to choose the optimum number of the circumferential and lateral grooves.

FIG. 3 shows a measurement result of the hydroplaning onset speed by changing the number of circumferential grooves, in which the number of circumferential grooves is shown on the axis of abscissas and the hydroplaning onset speed on the axis of ordinates by indices. In the measurement shown in FIG. 3, the influences from the groove area were eliminated by changing the circumferential groove width while maintaining the total groove area $S_T$ to be a specified area. As evident in FIG. 3, it is recognized that the hydroplaning onset speed is reduced and the wet resistance characteristic is deteriorated as the number of circumferential grooves is increased. Thus, when the total groove area is set at a specified value, it is found that the wet resistance characteristic is improved by reducing the number of circumferential grooves and increasing the area of each circumferential groove.

As a result of what is described hereinabove, the wet resistance characteristic comes to be improved by forming two or less circumferential grooves. However, in the case of one circumferential groove, a wider circumferential groove should be formed on the tire's equator. As the result, the steering stability and resistance to uneven wear are deteriorated, whereby the optimum number of circumferential grooves is two.

FIG. 4 shows a measurement result of the pattern noise and reactive force in running over a bump in a tire with two circumferential grooves formed in its tread pattern by maintaining the total groove area $S_T$ at a specified value and changing the number of lateral grooves. The number of lateral grooves is shown in the axis of abscissas, and the pattern noise and reactive force (in indices) are shown on the axis of ordinates. It is known from FIG. 4 that, when there are many lateral grooves, especially, the number thereof is 85 or more, as the area of each lateral groove can be reduced, the pattern noise is lowered so as to improve the low noise characteristic. And, as the reactive force in running over a bump is reduced, the enveloping power is increased to improve the riding comfort as well, thus properly improving the tire's characteristics in good balance.

BRIEF DESCRIPTION OF THE DRAWINGS

An embodiment of the present invention will now be described, by way of example, referring to the attached diagrammatic drawings, in which.

DETAILED DESCRIPTION OF THE INVENTION

Figure 1:
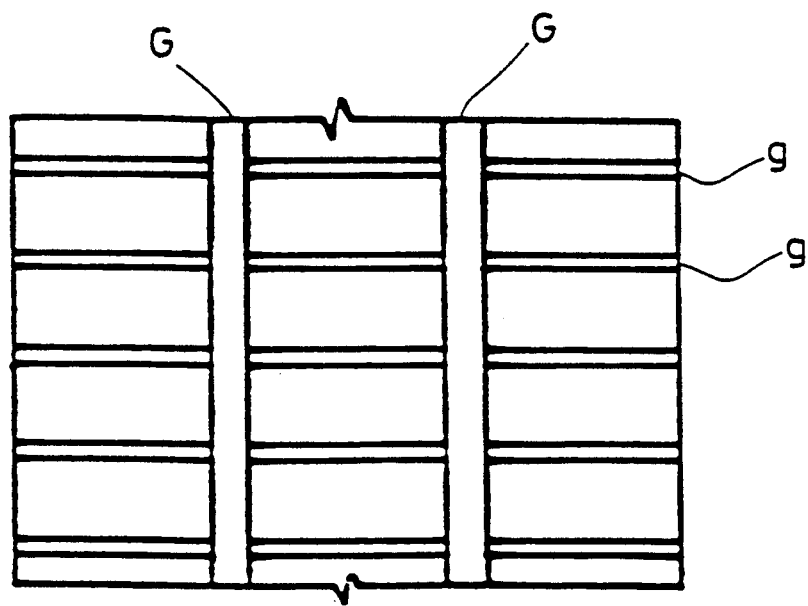
FIG. 1 is a plan view of a tread pattern showing one of the embodiments of the invention.
Figure 2:
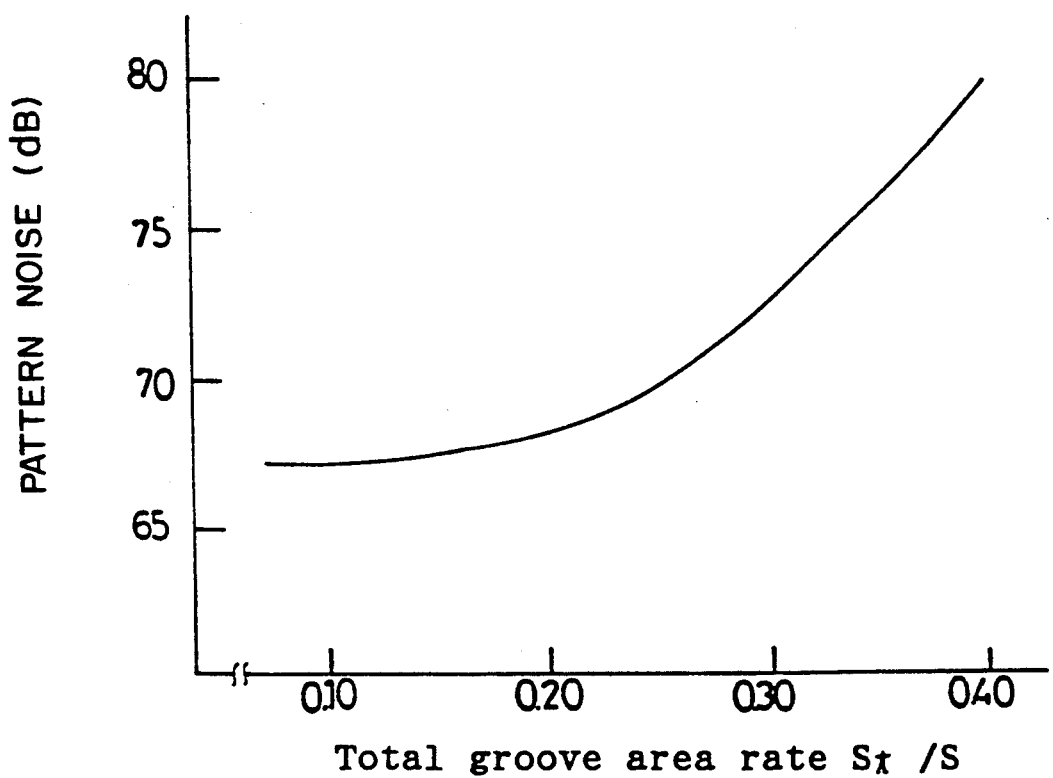
FIG. 2 is a diagram showing the relation between the total groove area quotient $S_T/S$ and the pattern noise.
Figure 3:
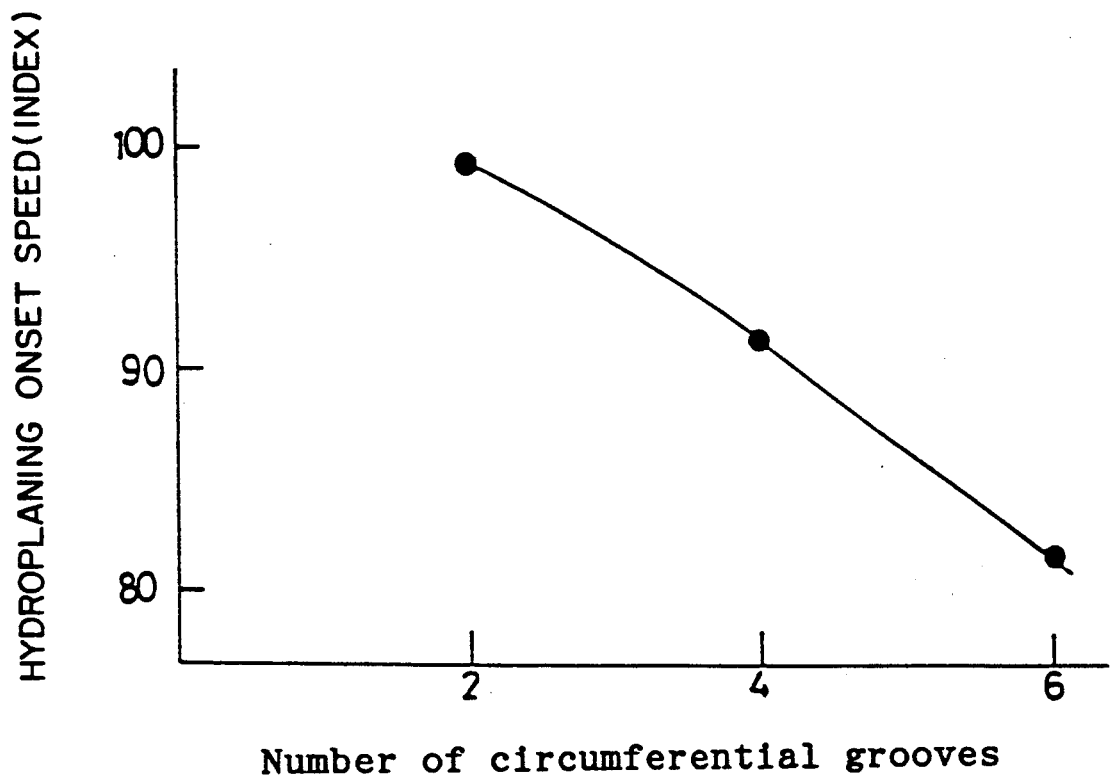
FIG. 3 is a diagram showing the relation between the number of grooves and the hydroplaning onset speed.
Figure 4:
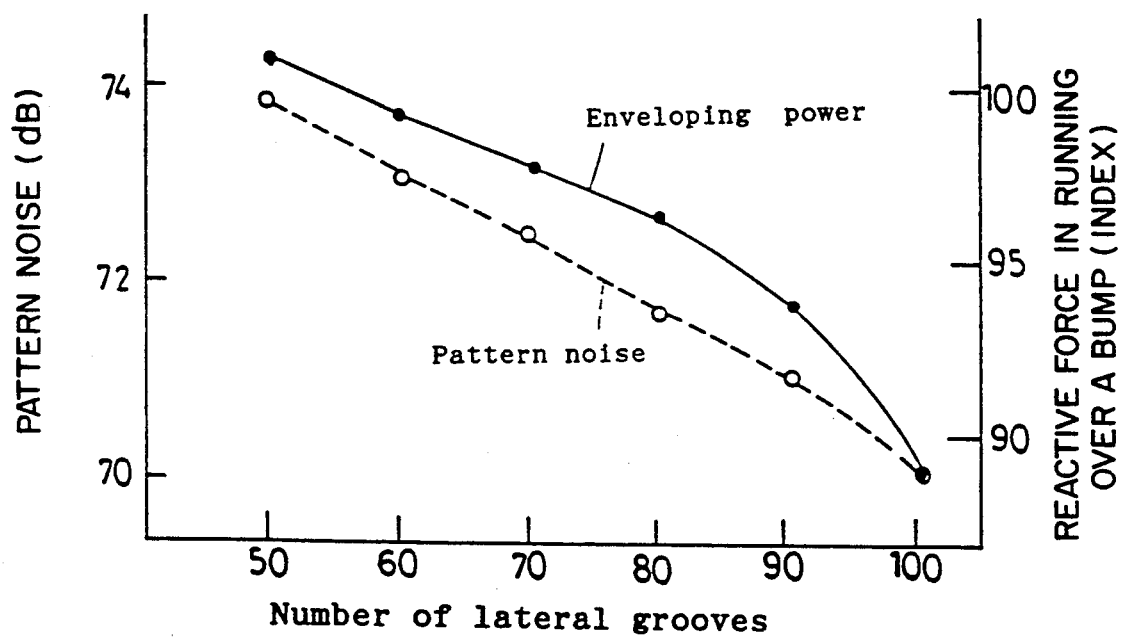
FIG. 4 is a diagram showing the relation between the number of lateral grooves and the envelope power, and the former and the pattern noise.
Figure 5:
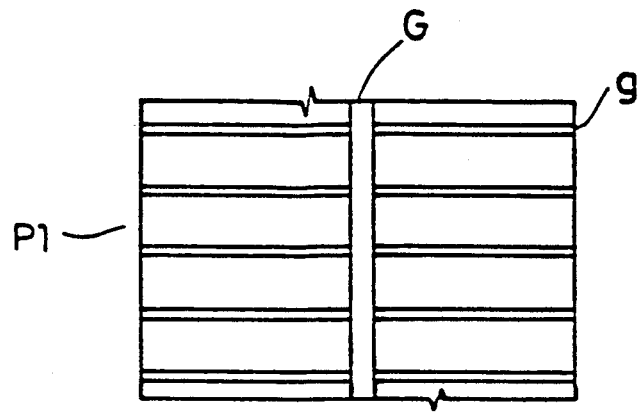
FIGS. 5 to 9 are diagrams showing examples of tread pattern employed in measuring the wet resistance characteristic.
Figure 6:
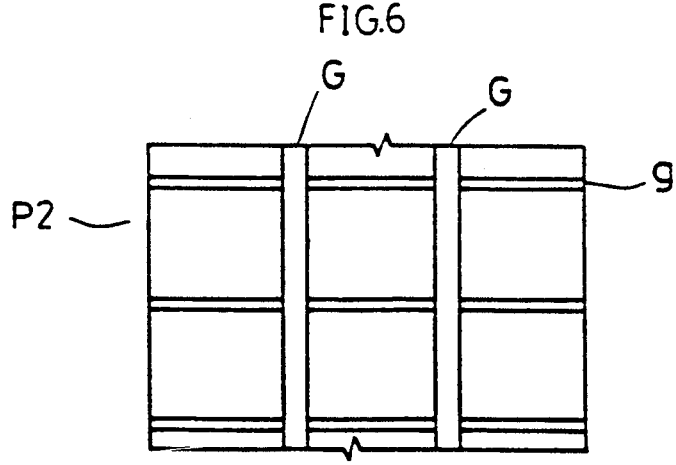
Figure 7:
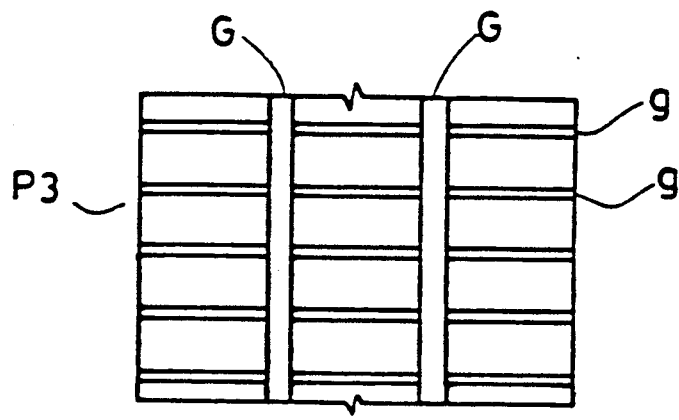
Figure 8:
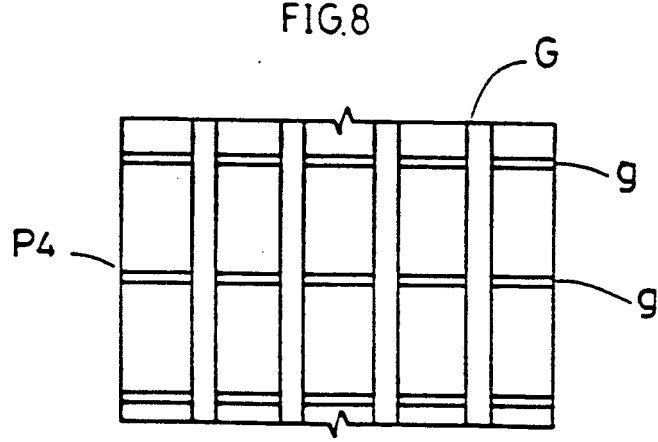
Figure 9:
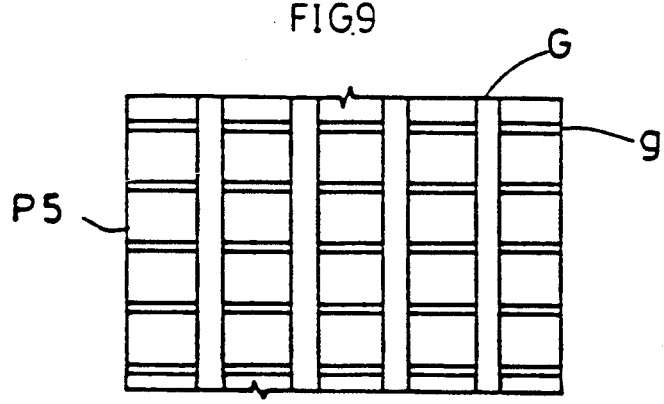

FIG. 1 is a plan development drawing showing one of the embodiments of a tire of the invention which has two circumferential grooves G. It is not preferred to form one circumferential groove G on the tire's equator, as mentioned hereinbefore, and if there are three or more circumferential grooves, the hydroplaning onset speed is reduced.

The quotient $S_T/S$ of the total groove area $S_T$ to the ground contact area S is set in a range from 0.15 to 0.25.

When the quotient $S_T/S$ exceeds 0.25, the pattern noise is increased and the low noise characteristic is deteriorated. The groove area is also increased and the block area is excessively decreased, which causes lack of dry grip power and cornering power. In addition, the wear resistance is reduced as well. On the other hand, when the quotient $S_T/S$ is less than 0.15, the wet resistance is significantly reduced, and the tire's performance such as the riding comfort on the premise of presence of grooves can not be obtained.

In addition, the area quotient $Sg/S_G$ of the lateral grooves to the circumferential grooves is more than 0.33 and less than 0.53. When it is 0.33 or less, the lateral groove area quotient Sg/S comes to be too small, and, although the wet resistance and low noise characteristic are improved, the riding comfort is reduced due to the increased reactive force in running over a bump to increase the envelope power. And, moreover, the steering stability is also deteriorated due to the decrease in cornering power.

When the quotient $Sg/S_G$ is more than 0.53, the circumferential groove area quotient $S_G/S$ comes to be excessively reduced. As a result, the hydroplaning onset speed is lowered, the wet resistance characteristic is deteriorated, the pattern noise is increased, and thereby the low noise characteristic is deteriorated.

The number of lateral grooves g is set at 85. In the case that it is less than 85, not only the pattern noise is increased, but also the envelope power is reduced, which leads to the deterioration of the riding comfort.

The number of the circumferential grooves G and that of the lateral grooves g are set at 2 and 85 or more, respectively, while the practical values such as groove width should be determined depending on the values of the total groove area quotient $S_T/S$ and quotient Sg/S.

EXAMPLES

A prototype of a tire having a tire size of 195/60R15 and a tread pattern shown in FIG. 1 was produced based on specifications shown in Table 2. The wet resistance, steering stability, riding comfort and low noise characteristic of the tire and that of comparison tire including a conventional tire shown in the table 2 were measured.

A hydroplaning onset speed for the wet resistance, a cornering power for the steering stability, an envelope power for the riding comfort and a pattern noise for the low noise characteristic were respectively measured, of which results are shown by indices setting the embodiment 1 at 100, and a higher score shows a better result in all cases.

In the measurement, the tires were mounted on a standard rim (15×5·½ —J), inflated with a normal internal pressure (1.9 kg/cm²) and loaded with a normal load (400 kg), and the general measurement method was employed.

The sum of scores is shown in the lower column of Table 2 as a comprehensive performance. It is confirmed that the tire's characteristics are increased in good balance in the embodiment to comprehensively improve the performance.

TABLE 1

| pattern | total groove area quotient St/S | circumferential groove area quotient SG/S | lateral groove area quotient Sg/S | hydroplaning onset speed (km/h) |
|---|---|---|---|---|
| P1 | 0.203 | 0.57 | 0.14 | 70.4 |
| P2 | 0.182 | 0.11 | 0.68 | 72.2 |
| P3 | 0.251 | 0.114 | 0.137 | 74.6 |
| P4 | 0.289 | 0.229 | 0.60 | 80.7 |
| P5 | 0.348 | 0.229 | 0.119 | 82.3 |

TABLE 2

| | embodiment | comparison 1 | comparison 2 | comparison 3 |
|---|---|---|---|---|
| number of circumferential grooves | 2 | 2 | 4 | 2 |
| number of lateral grooves (pitch number) | 90 | 60 | 90 | 60 |
| total groove area quotient | 0.215 | 0.215 | 0.215 | 0.242 |
| circumferential groove area rate | 0.143 | 0.143 | 0.143 | 0.143 |
| lateral groove area quotient | 0.072 | 0.072 | 0.072 | 0.099 |
| area quotient of lateral to circumstantial grooves | 0.503 | 0.503 | 0.503 | 0.692 |
| wet resistence | 100 | 100 | 95 | 102 |
| riding comfort | 100 | 95 | 101 | 101 |
| noise | 100 | 93 | 100 | 88 |
| steering stability | 100 | 101 | 92 | 100 |
| comprehensive performance | 400 | 389 | 388 | 391 |

We claim:

1. A pneumatic tire having in a tread part with first and second tread edges, a tread pattern divided by only first and second circumferential grooves extending substantially straight in the circumferential direction of a tire and at least eighty five lateral grooves, each of said lateral grooves extending between said first tread edge and said second tread edge and crossing said circumferential grooves, wherein the quotient $S_T/S$ of the total groove area $S_T$ which is the sum of a circumferential groove area $S_G$ and a lateral groove area Sg in a ground contact surface S when the tire is mounted on a standard rim, inflated with a normal internal pressure and loaded with a normal load, to said ground contact area S, is in a range from 0.15 to 0.25, and the quotient $Sg/S_G$ of said lateral groove area Sg to said circumferential groove area $S_G$ is in a range from 0.33 to 0.53.

2. The pneumatic tire according to claim 1, wherein said lateral grooves extend substantially straight.

3. A pneumatic tire having in a tread part with first and second tread edges, a tread pattern divided by only first and second circumferential grooves extending substantially straight in the circumferential direction of a tire, each of said circumferential grooves having substantially parallel grooves edges at the tread surface, and at least eighty five lateral grooves, each of said lateral grooves extending between said first tread edge and said first circumferential groove, between said first and second circumferential grooves and between said second circumferential groove and said second tread edge, wherein the quotient $S_T/S$ of the total groove area $S_T$ which is the sum of a circumferential groove area $S_G$ and a lateral groove area Sg in a ground contact surface S when the tire is mounted on a standard rim, inflated with a normal internal pressure and loaded with a normal load, to said ground contact area S, is in a range from 0.15 to 0.25, and the quotient $Sg/S_G$ of said lateral groove area Sg to said circumferential groove area $S_G$ is in the range from 0.33 to 0.53.

4. The pneumatic tire according to claim 3, wherein said lateral grooves extend substantially straight.

* * * * *